April 24, 1945. H. W. GRAY 2,374,598
ALKYD RESINS
Filed July 28, 1943
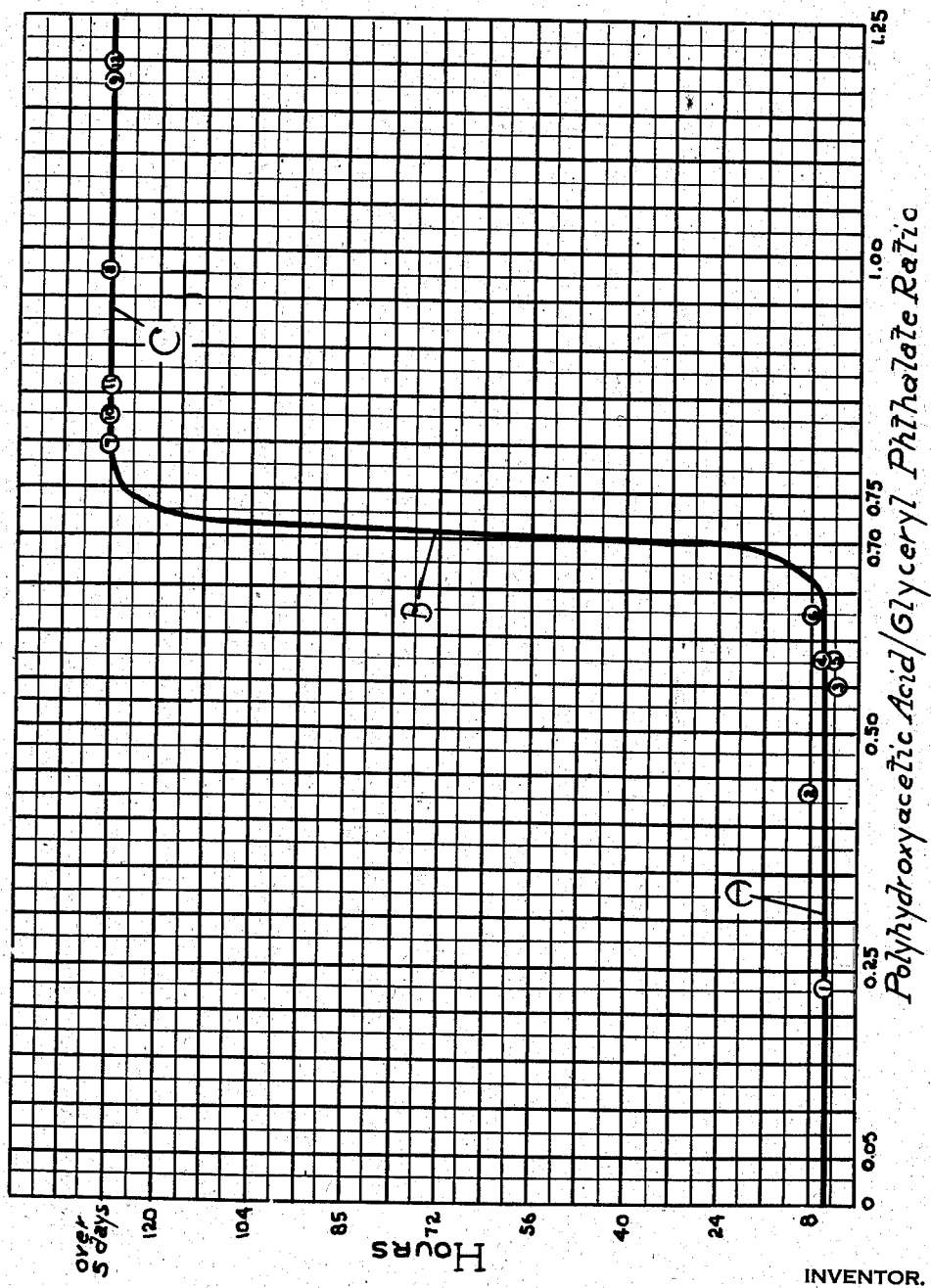
INVENTOR.
Hugh William Gray
BY R. F. Miller
ATTORNEY.

Patented Apr. 24, 1945

2,374,598

UNITED STATES PATENT OFFICE 2,374,598

ALKYD RESINS

Hugh William Gray, Wilmington, Del., assignor to E. I. du Pont de Nemours & Company, Wilmington, Del., a corporation of Delaware Application July 28, 1943, Serial No. 496,491

4 Claims. (Cl. 260—22)

This invention relates to resinous materials and more particularly to drying oil-modified alkyd resins.

The alkyd or polyhydric alcohol-polybasic acid resin coating compositions, and particularly the drying oil modified glyceryl phthalates are of great commercial utility. However, phthalic anhydride and glycerol are comparatively expensive ingredients, and under present conditions allocations do not permit their use in many important applications. Hence, replacement of a portion of the glyceryl phthalate in such resins by a cheaper, more available ingredient would be extremely desirable. Numerous attempts have been recorded in the literature to realize this end, but such efforts have been uniformly unsuccessful in that resins containing other lower-cost ingredients have not been equivalent in performance to the glyceryl phthalate compositions. Specifically, it has been proposed to use hydroxy acids, for example, hydroxyacetic acid, as ingredients of alkyd resins. Hydroxyacetic acid is a readily available commercial product of extremely low cost, being prepared by catalytic reactions from such basic raw materials as carbon monoxide, hydrogen and water. However, attempts of prior investigators to utilize this attractive material have given only resins of inferior quality, the resulting coating composition formulations exhibiting very poor drying characteristics and film properties.

This invention has as an object the production of new and useful resinous compositions. A further object is the manufacture of high quality resins containing substantial proportions of hydroxyacetic acid. A further object is the preparation of improved coating compositions. Still further objects reside in methods for obtaining these resins. Other objects will appear hereinafter.

I have discovered that resins having a remarkably short drying time as compared to the resins previously made from linseed oil, glycerol, hydroxyacetic acid and phthalic anhydride can be obtained from these ingredients when both the ratio of poly-hydroxyacetic to glyceryl phthalate and the linseed oil content are kept within certain limits. More particularly the above objects are accomplished by reacting hydroxyacetic acid, glycerol, phthalic anhydride and linseed oil or linseed oil acids in such proportions that the calculated ratio of polyhydroxyacetic acid to glyceryl phthalate in the finished resin is below 0.70, and the calculated linseed oil content is from 30% to 70%. In the practice of this invention, as in the manufacture of alkyd resins generally, glycerol can be replaced by other polyhydric alcohols, and phthalic acid or anhydride can be replaced by other polybasic acids.

The single figure in the accompanying drawing shows by means of a curve the drying times of resins having different ratios of polyhydroxyacetic acid to glyceryl phthalate.

The substantially horizontal portion A of the curve represents the drying time of the resins of this invention which have a ratio of polyhydroxyacetic acid to glyceryl phthalate of less than 0.70. The substantially vertical portion B shows the rapid increase in drying time that takes place with a very small increase in the polyhydroxyacetic acid-glyceryl phthalate ratio above 0.70. The horizontal portion C of the curve shows the long drying time required for all resins, including those of the present type previously disclosed, which have a ratio of polyhydroxyacetic acid to glyceryl phthalate but slightly above 0.70.

The points 1 to 6 designate the drying times of the resins disclosed in Examples I to VI respectively. Points 8 and 9 represent the drying times of two previously disclosed resins the formulations of which, together with those of other resins corresponding to points 7, 10, 11 and 12, are more particularly noted hereinafter.

The resins of this invention are preferably prepared by the solution method. In this procedure the linseed oil or linseed oil acids are reacted with glycerol to form a partial glyceride and this partial glyceride esterified simultaneously with hydroxyacetic acid and phthalic anhydride. More specifically, the linseed oil or linseed oil acids and the glycerol in proportions calculated to give the degree of alcoholysis desired are placed along with a small amount of alcoholysis catalyst (e. g. 0.01 to 1% litharge or sodium hydroxide based on the oil) in a reactor fitted with an agitator, a device to measure the temperature and a gas inlet. The mixture is then heated with stirring from one to two hours at about 200° to 225° C., an oxygen-free inert gas such as carbon dioxide or nitrogen being passed into and over the mixture. Hydroxyacetic acid and phthalic anhydride in the desired proportions together with a small amount of hydrocarbon solvent such as xylene or toluene are next introduced and the heating continued. The distilling vapors of solvent and water of esterification are passed through a condenser, the water is separated mechanically from the condensed liquids and the solvent returned to the reaction vessel, the whole cycle of distillation, separation of water and return of solvent being conducted in a continuous manner. Heating is continued until a product having the desired acid number and viscosity is obtained. During the above process additional solvent is added from time to time to maintain the temperature at the desired point.

Satisfactory results can also be obtained by combining the above stepwise esterification, that is, by simultaneous reaction of linseed oil acids, hydroxyacetic acid, phthalic anhydride and glycerol.

Either of the above procedures can also be conducted in the absence of a hydrocarbon solvent, this technique being known as the "fusion method."

In any of these methods the heating is continued until the desired state of condensation is effected. This point is determined by acid number and/or viscosity measurements. The selection of acid number or viscosity to which the final resin should be carried depends on the particular type of resin being made and the use for which it is intended. When the resin is finished, it is dissolved in a suitable solvent and then clarified if necessary by centrifuging or filter pressing after which it is ready for formulation into coating compositions in the usual ways.

Ordinary commercial grades of hydroxyacetic acid, glycerol, phthalic anhydride and linseed oil or linseed oil acids can be used in the practice of this invention.

The more detailed practice of the invention is illustrated in the examples wherein the amounts of the ingredients are by weight. In these examples, viscosities are expressed in poises at 25° C. Colors are on the Gardner-Holdt scale. Acid numbers are based on the solids. The drier proportions refer to the per cent of metal added as the soluble naphthenate soap, based on the drying oil content of the resin. The term "mineral spirits" refers to an aliphatic hydrocarbon fraction boiling at 150°–200° C. and the term "hi-flash naphtha" refers to an aromatic hydrocarbon solvent boiling at 160°–200° C. The "ester formulas" at the beginning of each example are an index to proportions of the various esters theoretically present in the product. To illustrate, a product referred to as comprising 35% linseed oil, 20% polyhydroxyacetic acid (as —OCH$_2$CO—) and 45% glyceryl phthalate is a product prepared from proportions of reactants so chosen as to yield a mixture of the three mentioned constituents in the stated proportions by weight if it be assumed no mixed esters are formed. Actually such a product is considered to be composed principally of mixed glycerides, probably mixtures of mixed glycerides, though small amounts of simple glycerides or partial glycerides (i. e. glycerol, incompletely esterified), free glycerol and free acids are undoubtedly present.

Example I

*Ester formula*

| | |
|---|---|
| Linseed oil | per cent__ 54.4 |
| Polyhydroxyacetic acid | do____ 8.6 |
| Glyceryl phthalate | do____ 37.0 |
| Polyhydroxyacetic acid/glyceryl phthalate ratio | 0.23 |

A solution method reactor is charged with 280 parts of linseed oil acids, 101 parts of dynamite glycerol, 148 parts of phthalic anhydride and 60.7 parts of hydroxyacetic acid. The mixture is heated with vigorous stirring under a blanket of carbon dioxide at 190°–230° C. for 7 hours. During this time a total of 48 parts of toluene is added in portions, 50 parts of water of esterification and 25 parts of toluene being removed by condensation of the reflux vapors. At this point the resin has an acid number of 11.7 and heating is stopped and the resin cooled. A solution of 55 parts of this resin in 13.5 parts of hi-flash naphtha and 31.5 parts of mineral spirits has a viscosity of 1.25 poises and a color of 3.3.

A portion of this solution containing 0.05% cobalt (as the soluble naphthenate, based on the calculated linseed oil content) was flowed on metal plates. The films air dried tack free in 5 to 7 hours; in comparison, a commercial linseed oil-modified glyceryl phthalate (RC-203, 54.4% linseed oil, 45.6% glyceryl phthalate) gave tack free films in about 5 hours. The films were equivalent in abrasion resistance to the RC-203 control films. Similar results were obtained by incorporation of 1.0% lead and 0.15% manganese (as the naphthenates, based on oil) instead of cobalt. Films containing no drier were hard and tough after baking for two hours at 140° C.

Example II

*Ester formula*

| | |
|---|---|
| Linseed oil | per cent__ 35 |
| Polyhydroxyacetic acid | do____ 20 |
| Glyceryl phthalate | do____ 45 |
| Polyhydroxyacetic acid/glyceryl phthalate ratio | 0.44 |

A solution method reactor is charged with 73.2 parts of linseed oil acids and 38.1 parts of 95% glycerol. The mixture is heated with vigorous stirring under carbon dioxide at 210° C. for 4½ hours, 8 parts of water of esterification being collected. The oil is cooled to room temperature and 69.5 parts of phthalic anhydride and 52.4 parts of hydroxyacetic acid are added. The mixture is then heated under carbon dioxide with stirring at 210° C. for 4 hours, a total of 31 parts of hi-flash naphtha being added to maintain reflux. Twenty parts of water of esterification and 13 parts of hi-flash naphtha are collected during this heating period. A solution of 27.5 parts of the resin in 6.75 parts of hi-flash naphtha and 15.75 parts of mineral spirits has a viscosity of over 150 poises and a color of 6. A solution of 24 parts of the resin in 15.3 parts of hi-flash naphtha and 35.7 parts of mineral spirits has a viscosity of about 1.8 poises, the solids concentration being 32.0%. Films containing cobalt or lead and manganese drier air dried tack free in 8 hours.

Example III

*Ester formula*

| | |
|---|---|
| Linseed oil | per cent__ 41.6 |
| Polyhydroxyacetic acid | do____ 20.8 |
| Glyceryl phthalate | do____ 37.6 |
| Polyhydroxyacetic acid/glyceryl phthalate ratio | 0.55 |

A mixture of 86.2 parts of linseed oil and 18.7 parts of dynamite glycerol is placed in a solution method reactor and heated under nitrogen to 90°–100° C. To the mixture is added 0.08 part of litharge suspended in 0.08 part of linseed oil. The stirred mixture is heated to 225° C. and held at that temperature for two hours, a clear, homogeneous solution being obtained. To the hot solution is added 56.5 parts of hydroxyacetic acid and 58.6 parts of phthalic anhydride. After stirring the mixture at 225° C. for one-half hour 7.1 parts of dynamite glycerol is added. Heating is continued for 3½ hours at 225° C., 22 parts of toluene being added portionwise to maintain reflux, with water of esterification being removed from the condensate. The resulting resin has an acid number of 15.8. A solution of 30 parts of the resin in 67 parts of mineral spirits has a viscosity of 1.4 poises and a color of 5.2, the solids content being 28.0%.

To this solution was added 0.05% of cobalt (as the naphthenate, based on oil), and films were flowed on metal plates. Clear, hard, tough films were obtained by air drying, the films being tack free in 3 hours, as were similar films prepared from the control RC-203. Films of similar drying rate and physical properties were obtained using 1.0% lead and 0.15% manganese instead of the cobalt drier.

EXAMPLE IV

*Ester formula*

| | |
|---|---|
| Linseed oil_____per cent | 48.1 |
| Polyhydroxyacetic acid_____do____ | 19.0 |
| Glyceryl phthalate_____do____ | 32.9 |
| Polyhydroxyacetic acid/glyceryl phthalate ratio | 0.58 |

A solution method reactor is charged with 293 parts of linseed oil, 61.3 parts of dynamite glycerol and 0.5 part of sodium hydroxide dissolved in 2 parts of water. The mixture is heated with vigorous stirring under a blanket of carbon dioxide at 200° C. for 2 hours. To the hot oil is added cautiously 148 parts of phthalic anhydride, 152 parts of hydroxyacetic acid, 10 parts of dynamite glycerol and 43 parts of toluene. This mixture is heated at 200°–210° C. for 6 hours during which time a total of 55 parts of water of reaction is removed together with 23 parts of toluene. The resulting resin has an acid number of 11. A solution of 55 parts of the resin in 13.5 parts of hi-flash naphtha and 31.5 parts of mineral spirits has a viscosity of 6.27 poises and a color of 6.4. A solution of 50 parts of the resin in 15.9 parts of hi-flash naphtha and 37.1 parts of mineral spirits has a viscosity of 1.25 poises and a color of 6.3. This latter solution contains 48.5% solids.

Films containing 0.05% cobalt drier air dried tack free in 6 to 8 hours, and were equivalent to the RC-203 control in hardness and print resistance. Films containing 1.0% lead and 0.15% manganese air dried tack free in 3½ hours. All the films were superior to the RC-203 control films in abrasion resistance.

Films were flowed on metal plates from pigmented compositions prepared by blending with a standard toluidine red mill base. The films air dried tack free in 5½ hours, and were equivalent in hardness and gloss to controls based on RC-203. The baked films (1 hour at 200° F.) were likewise equivalent to the controls. Adhesion and flexibility were excellent, the films exhibiting good resistance to atmospheric conditions after 16 months' outdoor exposure.

EXAMPLE V

*Ester formula*

| | |
|---|---|
| Linseed oil_____per cent__ | 43.2 |
| Polyhydroxyacetic acid_____do____ | 20.8 |
| Glyceryl phthalate_____do____ | 36.0 |
| Polyhydroxyacetic acid/glyceryl phthalate ratio | 0.58 |

A solution method reactor is charged with 256 parts of linseed oil acids, 107 parts of dynamite glycerol, 165 parts of phthalic anhydride and 169.5 parts of hydroxyacetic acid. The mixture is heated with vigorous stirring under a blanket of carbon dioxide at 200°–240° C. for 9 hours. During this time a total of 61 parts of toluene is added in portions sufficient to maintain reflux, the water of esterification being removed as previously described. A total of 77 parts of water and 38 parts of toluene is collected in this manner. The resulting resin has an acid number of 11.1. A solution of 55 parts of the resin in 13.5 parts of hi-flash naphtha and 31.5 parts of mineral spirits has a viscosity of about 80 poises and a color of 4.4. A 41.6% solution of the resin in the hi-flash naphtha-mineral spirits mixture has a viscosity of 1.25 poises and a color of 4.0.

Films baked for 2 hours at 140° C. were hard and tough, the hardness being equivalent to RC-203 control films. Films containing 0.05% of cobalt drier air dried tack free in 3 to 5 hours, the overnight hardness and abrasion resistance being equivalent to that of the control RC-203 films.

EXAMPLE VI

*Ester formula*

| | |
|---|---|
| Linseed oil_____per cent__ | 35 |
| Polyhydroxyacetic acid_____do__ | 25 |
| Glyceryl phthalate_____do__ | 40 |
| Polyhydroxyacetic acid/glyceryl phthalate ratio | 0.625 |

A solution method reactor is charged with 73.2 parts of linseed oil acids and 34.8 parts of 95% glycerol. The mixture is heated with vigorous stirring under a blanket of carbon dioxide for 4½ hours at 210° C., a total of 6 parts of water of esterification being collected. The resulting oil is cooled to room temperature and 61.9 parts of phthalic anhydride and 65.5 parts of hydroxyacetic acid are added. This mixture is heated under carbon dioxide with stirring for 4 hours at 210° C. During this period a total of 33 parts of hi-flash naphtha was added in portions sufficient to maintain reflux, 23 parts of water of esterification being collected. A solution of 27.5 parts of the resin in 6.75 parts of hi-flash naphtha and 15.75 parts of mineral spirits has a viscosity of over 150 poises and a color of 6. A solution of 25 parts of the resin in 15.6 parts of hi-flash naphtha and 36.4 parts of mineral spirits has a viscosity of 1.0 poise, the solids content being 32.5%. Films containing 0.05% cobalt, or 1.0% lead and 0.15% manganese air dried tack free in 8 hours.

As previously indicated, the ratio of the polymeric hydroxyacetic acid to the polyhydric alcohol-polybasic acid ester, e. g. glyceryl phthalate, portion of the resin should be below 0.7 and is preferably not less than 0.1 in order to realize the economic advantages of the invention as well as the technical advantage, namely, decrease in the tendency of the resin to gel.

The remarkably improved drying time of the resin prepared in accordance with this invention as compared to those made with higher ratios of hydroxyacetic acid to glyceryl phthalate is shown by the following table wherein the first six items are the resins of Example I to VI designated by points 1 to 6 respectively on the curve, and items 7 to 12 are resins which are designated by the corresponding points on the curve and which contain ratios of hydroxyacetic acid to glyceryl phthalate above 0.7. Films of the latter resins were still soft and tacky after air drying for five days.

POLYHYDROXYACETIC ACID

| Resin No. | Example | Composition | | | | Drying time, hours |
|---|---|---|---|---|---|---|
| | | Linseed oil | Polyhydroxyacetic acid | Glyceryl phthalate | PHA/GP ratio | |
| 1 | I | 54.5 | 8.6 | 37.0 | 0.23 | 5–7 |
| 2 | II | 35.0 | 20.0 | 45.0 | 0.44 | 8 |
| 3 | III | 41.6 | 20.8 | 37.6 | 0.55 | 3 |
| 4 | IV | 48.1 | 19.0 | 32.9 | 0.58 | 3.5–8 |
| 5 | V | 43.2 | 20.8 | 36.0 | 0.58 | 3–5 |
| 6 | VI | 35.0 | 25.0 | 40.0 | 0.625 | 8 |
| 7 | | 55.0 | 20.0 | 25.0 | 0.80 | >5 days |
| 8 | | 45.5 | 27.0 | 27.5 | 0.98 | >5 days |
| 9 | | 47.7 | 28.3 | ¹24.0 | ¹1.18 | >5 days |
| 10 | | 45.0 | 30.0 | 25.0 | 0.83 | >5 days |
| 11 | | 35.0 | 35.0 | 30.0 | 0.86 | >5 days |
| 12 | | 45.0 | 25.0 | 30.0 | 1.20 | >5 days |

¹ Glyceryl glutarate was used in this case.

The resins of this invention can be prepared from any polyhydric alcohol and from any resinifiable polycarboxylic acid. Upon saponification with alkali, the resins revert to the polyhydric alcohol, the alkali salt of the polycarboxylic acid, the alkali salt of the hydroxyacetic acid and the alkali salt of the fatty oil acid.

Among the various polyhydric alcohols that can be used, there may be mentioned ethylene glycol, propylene glycol, butylene glycol, diethylene glycol, triethylene glycol, glycerol, polyglycerols, sorbitol, pentaerythritol, mannitol and various mixtures of these polyhydric alcohols.

Polycarboxylic acids which can be used for the preparation of these products include succinic, adipic, sebacic, maleic, fumaric, itaconic, acetylenedicarboxylic, malic, tartaric, citric, camphoric, phthalic, isophthalic, terephthalic, diphenic and phenylglutaric acids. The anhydride can be used instead of the acid, and in many instances this is preferable.

The presence of linseed oil in the amounts previously indicated is essential for obtaining the unusual advantages disclosed herein. Other modifying agents which can be used in addition to the linseed oil include fatty oils, e. g., soya, China-wood, cottonseed, oiticica, perilla, castor, dehydrated castor, coconut, sunflower seed and corn oils; monocarboxylic acids, e. g., butyric, stearic, acrylic, furacrylic, oleic, lactic, chloroacetic, benzoic, salicylic, and rosin acids, also the acids derived from any of the fatty oils just mentioned; and monohydric alcohols, e. g., butyl, n-dodecyl, benzyl and cyclohexyl alcohols.

The optimum proportion of linseed oil to be used may vary within wide limits depending on the uses in which the resin is to be employed. More specifically, larger amounts of oil give softer, more durable resins for use in paints, while lower amounts of oil give harder, faster-drying resins for use in varnishes and enamels. Those resins containing 30 to 70% linseed oil represent the compositions of greatest practicality and commercial significance.

In preparing the resins of this invention, the proportions used are usually stoichiometric, but may be varied to some extent if desired. In some instances an excess of glycerol (e. g. 1 to 4%) may give somewhat faster drying rates. The method of reaction can be any of the methods known to the art, but, as already noted, it should be chosen with due consideration of the type of resin being prepared and the use for which it is intended. The order of reacting the ingredients can be varied depending upon the nature of the reactants employed. Fatty oils should be heated with all or a part of the polyhydric alcohol before addition of the acid components. When only acid and alcohol components are employed a common procedure is to heat them all together, though practically any order of reaction is suitable. Interchange reactions involving esters of hydroxyacetic acid are entirely feasible in preparation of the resins. The hydroxyacetic acid may be used as a commercially available water solution, the solvent water being removed together with water of esterification during the making cycle.

Any temperature at which the reaction proceeds in a convenient length of time is operable in the present invention. The preferred range is from 150°–250° C. though temperatures outside this range are operable, being limited only by the slowness of reaction or the tendency to formation of colored products. Various catalysts can be used, including litharge or sodium hydroxide for ester interchange, or various acids for esterification. Certain acid salts such as monosodium phosphate may serve to improve the color of the resins.

The soluble products of this invention are useful as vehicles for improved air drying or baking coating compositions. These coatings can be made up as desired and in known manner with pigments, metallic driers, dyes, fillers, waxes, inhibitors, plasticizers, thinners and all such common auxiliary components. Such coatings can also contain as needed and desired other film-forming materials such as for example cellulose nitrate, cellulose acetate, ethyl cellulose, and other cellulose derivatives; chlorinated rubber, isomerized rubber and other rubber derivatives; urea-formaldehyde resins; phenol-formaldehyde resins; other alkyd resins; gums, such as rosin, ester gum and limed rosin; soluble types of nylons, and resins such as polymethyl methacrylate, polystyrene and polyvinyl acetate. Any of these compositions can be used, directly or over suitable base coats, on metal, wood, glass, leather, stone, cloth, paper, rubber, and in general any surface which is to be protected from atmospheric or other influences. These resins can also be used in adhesive and molding compositions with or without the other polymeric materials above. Certain of these compositions are also of value as grinding vehicles in pigment formulation and in incorporation of hydrophilic extenders in such pigment formulations.

As many apparently widely different embodiments of this invention may be made without departing from the spirit and scope thereof, it is to be understood that I do not limit myself to the specific embodiments thereof except as defined in the appended claims.

I claim:

1. The resinous reaction product of ingredients comprising hydroxyacetic acid, polyhydric alcohol, polybasic carboxylic acid and a substance selected from the group consisting of linseed oil and linseed oil acids, said resinous reaction product containing, when expressed in terms of said ingredients, from 30% to 70% linseed oil and a ratio of polyhydroxyacetic acid to polyhydric alcohol-polybasic acid ester of at least 0.1 and below 0.7.

2. A linseed oil modified alkyd resin the composition of which, expressed in terms of its chemically combined components, comprises from 30% to 70% linseed oil, and polyhydroxyacetic acid and glyceryl phthalate in a ratio of the polyhydroxyacetic acid to the glyceryl phthalate of at least 0.1 and below 0.7.

3. A process for making fast drying resins from ingredients which comprise hydroxyacetic acid, polyhydric alcohol, polybasic carboxylic acid, and a substance selected from the group consisting of linseed oil and linseed oil acids, said process comprising reacting with heat treatment at alkyd resin-forming temperatures said ingredients in proportions which yield a resin containing, when expressed in terms of said ingredients, from 30% to 70% linseed oil and a ratio of polyhydroxyacetic acid to polyhydric alcohol-polybasic acid ester of at least 0.1 and below 0.7.

4. A process for making fast drying resins from ingredients which comprise glycerol, phthalic anhydride, hydroxyacetic acid and a substance selected from the group consisting of linseed oil and linseed oil acids, said process comprising reacting with heat treatment at alkyd resin-forming temperatures said ingredients in proportions which yield a resin containing, when expressed in terms of said ingredients, from 30% to 70% linseed oil and a ratio of polyhydroxyacetic acid to glyceryl phthalate of at least 0.1 and below 0.7.

HUGH WILLIAM GRAY.